3,121,704
POLYMERIC PRODUCT AND METHOD OF PRODUCING SAME
Rip G. Rice, Buell H. Geib, and Lloyd A. Kaplan, San Diego, Calif., assignors to General Dynamics Corporation (Convair Division), San Diego, Calif., a corporation of Delaware
No Drawing. Filed June 20, 1960, Ser. No. 37,052
12 Claims. (Cl. 260—54)

This invention relates to the curing of condensation products or adducts of phosphonitrilic halides and polyfunctional organic compounds, and is particularly concerned with production of cured condensation products of cyclic phosphonitrilic chlorides with aromatic polyhydroxy compounds, to form a coating of improved thermal stability.

The production of a novel class of adducts of cyclic phosphonitrilic halides, particularly the chlorides, with polyfunctional compounds, especially polyhydroxy aromatic compounds, is described in the copending applications of Rip G. Rice and Robert L. Riley, Serial Nos. 820,573 and 820,574, filed June 16, 1959, both now abandoned, and Serial Nos. 31,813 and 31,814, filed May 26, 1960. The condensation products produced, e.g., those obtained from cyclic phosphonitrilic chlorides and polyhydroxy aromatic compounds, particularly hydroquinone, can be cured by heating at elevated temperatures to form a resin having good resistance to high temperatures.

It is an object of this invention to form products of improved heat stability from the condensation product of phosphonitrilic halides with organic polyfunctional compounds.

Another object is to modify the condensation product of phosphonitrilic halides, particularly cyclic phosphonitrilic chlorides, and polyhydroxy aromatic compounds, especially hydroquinone, to form products of high heat resistance.

A still further object is to cure the aforementioned condensation product by reaction thereof with a chemical curing agent, to improve the physical properties of said condensation product, especially its heat stability.

Yet another object is to provide a chemically modified adduct or condensation product of the aforementioned type, which is particularly adapted for production of a coating having improved properties, particularly heat resistance, as compared to coatings formed from the unmodified condensation product which is cured solely by heating.

A still further object is the provision of procedure for producing the above mentioned novel modified or cured condensation product of phosphonitrilic halides and polyhydroxy aromatic compounds.

Other objects and advantages will appear from the description below of the invention.

It has been found according to the invention, that by reacting the adduct or condensation product of phosphonitrilic halides and polyhydroxy aromatic compounds, with hexamethylenetetramine, a product is obtained from which coatings can be formed having improved heat resistance, cohesive strength of film, flexibility and gloss retention, on exposure of the coatings to high temperatures, as compared to the uncured condensation product. While hexamethylenetetramine is a known source of formaldehyde which is released on heating, and reacts with the adduct to cure it, according to the invention, it has been surprisingly found that other sources of formaldehyde such as paraformaldehyde and trioxane do not function to produce the improved cured products of the invention, as will be pointed out more fully hereinafter.

The adducts or condensation products which are cured according to the invention process and which are described in the above copending applications of Rice and Riley, are produced by reaction of a cyclic phosphonitrilic halide such as the bromide or chloride, preferably the trimeric or tetrameric phosphonitrilic chloride or mixtures thereof, e.g. a mixture of about 75% trimer and about 25% tetramer, with polyhydroxy aromatic compounds having two or more hydroxy groups, such as hydroquinone, phloroglucinol, pyrogallol, catechol and resorcinol. The preferred polyhydroxy aromatic compound is hydroquinone.

The condensation reaction for producing the above noted adducts is carried out in the presence of a hydrogen halide acceptor, e.g. an HCl acceptor where a phosphonitrilic chloride is employed, for removal of all or a major portion of the chlorine atoms of the phosphonitrilic chloride. The preferred acceptors for this purpose are heterocyclic tertiary amines, including the picolines, and particularly pyridine itself. The reaction is also carried out preferably in a solvent medium. Such solvent can be a homogeneous solvent in which the reactants and the HCl acceptor are all soluble, or a heterogeneous solvent in which the phosphonitrilic chloride and the HCl acceptor are soluble, but in which the polyhydroxy aromatic compound, e.g. hydroquinone, is insoluble. Examples of homogeneous solvents include ethers such as dioxane, and nitriles, and examples of heterogeneous solvents include aliphatic and aromatic hydrocarbons such as hexane and benzene, and chlorinated hydrocarbons such as carbon tetrachloride.

The amount of polyhydroxy aromatic material employed is preferably at least 2 mols per mol of $PNCl_2$ in the phosphonitrilic chloride, and the amount of HCl acceptor employed is sufficient to react with substantially all the HCl formed in the reaction, preferably employing at least 2 mols per mol of $PNCl_2$.

The reaction is a substitution reaction in which most or all of the chlorine atoms of the phosphonitrilic chloride are replaced by residues of the polyhydroxy aromatic compound and the reaction takes place under conditions including temperature such that the PN-containing rings of the phosphonitrilic chloride starting material are preserved in the final product. The condensation product is in the form of a polymeric chain material containing a plurality of rings designated PN containing rings, or PN rings, and consisting of either or both trimeric ($P_3N_3$) or tetrameric ($P_4N_4$) rings, with adjacent rings linked by one or more residues of the polyhydroxy aromatic compound, e.g. by one or more aromatic dioxy radicals, in each of which linking residues a hydrogen atom of each of two of the functional hydroxy groups has been removed. The polymer also contains residues of the polyhydroxy aromatic compound in which a hydrogen atom of only one functional hydroxy group has been removed, e.g. aromatic oxy, such as phenoxy, radicals carrying free hydroxyl groups, such aromatic oxy radicals being connected to phosphorus atoms. Thus, where hydroquinone is the polyhydroxy aromatic compound, adjacent PN rings are linked by one or more p-phenylenedioxy radicals, and the polymer also contains p-hydroxy phenoxy residues containing free functional hydroxyl groups, within the polymeric chain and at the terminal portions thereof. The linkage of adjacent rings by one or more aromatic dioxy, e.g., p-phenylenedioxy, radicals takes place through adjacent phosphorus atoms on adjacent rings; that is, at least one of such radicals is attached to a pair of adjacent phosphorus atoms on adjacent PN rings. The adducts may contain from 0 to a minor proportion of chlorine, preferably from 0 to about 10% chlorine, depending upon the degree of substitution of the chlorine atoms of the phosphonitrilic chloride starting material by the radicals of the polyhydroxy aromatic compound, the remaining chlorine atoms being linked to some of the phosphorus atoms. The adducts may have a molecular weight of about 1,000 to about 15,000 usually about 1,200 to about 6,000.

More specifically, the above described condensation products or adduct are believed to have a plurality of recurring groups of the formula

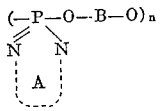

where A represents a member of the group consisting of $P_3N_3$ and $P_4N_4$ rings, B is an aromatic radical, and $n$ is an integer of at least 2, e.g. from 2 to about 15, or more, preferably 2 to 7. The condensation product may contain chlorine, e.g. connected to one or more phosphorus atoms of one or more of the A groups.

The entire description of the process for producing such adducts and the adducts thus produced, as described in the above copending applications, is incorporated herein by reference.

Due to the presence of some free functional hydroxyl groups on the aromatic or phenyl nuclei of the above described polymeric condensation product or adduct, the adduct can be considered a phenolic condensation preadduct, which can be cured by the formaldehyde furnished on heating of the hexamethylenetetramine, according to the invention. A further curing of the resulting polymer can be effected on heating it to an elevated temperature, as will be described more fully below.

In carrying out the invention for producing the cured polymeric adducts, e.g. in the form of a coating, the polymeric adduct of phosphonitrilic halide and polyhydroxy aromatic compound is dissolved in a preferably volatile organic solvent such as a ketone, e.g. acetone, or an alcohol, e.g. butyl alcohol, and the hexamethylenetetramine is added to the solvent. The amount of hexamethylenetetramine employed is preferably in the range of about 1 to about 15% by weight of the adduct, but amounts of hexamethylenetetramine outside this range can also be employed. The solids content of the solvent solution may range from about 25 to about 75% by weight of the solution. The solution is then applied to the surface of the material, e.g. a metal, to be coated, and on heating to between about 250° and 300° F., the initial curing takes place, whereby the hexamethylenetetramine is decomposed, releasing formaldehyde, and the latter reacts with the adduct. Such reaction is believed to produce a cross linking mainly between adjacent terminal aromatic or phenyl nuclei of the same or adjacent polymeric chains, for example, through methylene groups attached in ortho position with respect to the free hydroxyl groups on such adjacent terminal aromatic or phenyl nuclei. The adduct on curing in this manner is converted to a form which is resistant to high temperature and thermal shock. However, additional curing can be, and preferably is, effected by heating the hexamethylenetetramine-modified adduct at elevated temperature substantially above 300° F., e.g., to about 350° to 425° F. If desired, further heating of the polymer at still higher temperatures, e.g., of the order of 500° F., effects a still further curing of the polymer. However, this latter curing step is not necessary to obtain the improved polymers of the invention having high resistance to thermal shock.

The coatings so formed also have superior properties as compared to coatings formed from the solely heat cured adduct described in the above copending applications, as regards ability of the coated materials to be stored for extended periods at high temperature without adverse effect on the coating, high resistance to chemical attack by acids, alkalies, and organic compounds such as jet engine fuels, high impact strength, retention of flexibility over a wide temperature range of from about −70° F. to about 1200° F., and resistance to decomposition on subjection to temperatures of 500° F. to 1000° F. for relatively long periods.

In addition to application to metals, the hexamethylenetetramine-cured phosphonitrilic halide adducts of the invention can be applied to surfaces of glass, ceramics, rubber, polyethylene, and other materials. In forming such coatings, other compounding materials such as fillers, anti-oxidants, and other resins, can be included in the solvent into which the adduct and hexamethylenetetramine are incorporated.

The cured hexamethylenetetramine-modified adduct of the invention can also be employed for purposes other than formation of coatings. For example, the adduct of phosphonitrilic chloride and polyhydroxy aromatic compound can be admixed in dry form with the hexamethylenetetramine, and the mixture subjected to heat and pressure in a properly vented molding press to decompose the hexamethylenetetramine and produce a curing of the adduct in this manner to form a desired molded product.

The following are examples of practice of the invention:

EXAMPLE 1

A reaction flask was charged with 500 grams of a mixture of trimeric and tetrameric phosphonitrilic chlorides containing about 75% trimer and about 25% tetramer by weight, 1188 grams of hydroquinone, and 7.5 liters of carbon tetrachloride. This mixture was stirred and heated to reflux, then 854 grams of anhydrous pyridine was added, and refluxing and stirring were continued for a period of about 6 hours. When cool, the carbon tetrachloride was removed by decantation, leaving about 2200 milliliters of a thick, greenish-yellow oil, which was a mixture of the adduct of phosphonitrilic chloride and hydroquinone, with impurities. This oil was dissolved in 3.0 litres of a solution consisting of about 80% by volume of acetic acid and about 20% by volume of water, and the oil-solvent solution introduced in streams into a relatively large volume of flowing water under conditions to precipitate the adduct of phosphonitrilic chloride and hydroquinone in the form of a flocculent solid, which was filtered out of the mixture and dried. This purification and isolation procedure of the phosphonitrilic chloride-hydroquinone adduct is described in the copending application of Lloyd A. Kaplan, Serial No. 37,466, filed June 20, 1960.

About 120 grams of the adduct so produced, having a molecular weight of about 2500, was dissolved in 280 grams of n-butyl alcohol to form a coating solution. The solution was divided into four portions, each containing 30 grams of resin to 70 grams of alcohol. Fraction 1 was used as a control. To fraction 2 was added 3.0 grams hexamethylenetetramine; to fraction 3 was added 3.3 grams of paraformaldehyde, and to fraction 4 was added 3.3 grams of trioxane.

The coating fractions were each brushed onto 302 stainless steel panels to give a dry film thickness of approximately 1.0 ml. The panels were air dried 2 hours at room temperature, 1 hour at 150° F., 1 hour at 200° F., and 2 hours at 300° F.

At the end of this period, coatings of fractions 1, 3 and 4 were acetone soluble, whereas coatings of fraction 2 were acetone insoluble. This indicates that the resin containing the hexamethylenetetramine had been cured, whereas the other resin samples had not been cured.

The panels then were further cured 1 hour at 425° F. and were tested for flexibility on a ⅜ inch diameter bend of the metal, showed the following:

Films from fractions 1, 3 and 4 had poor cohesive strength and appeared to be shattered; films from fraction 2 cracked and separated in one area only, showing very good cohesive strength. Adhesion of fraction 2 films to the metal substrate was much better than that of films from fractions 1, 3 and 4.

The panels were then exposed 65 hours at 500° F. and showed the following characteristics:

Films from fractions 1, 3 and 4 had high gloss, but were crazed and dimpled; films from fraction 2 had high gloss and exhibited no crazing or dimpling.

The panels were then exposed 24 hours at 650° F. and showed the following characteristics:

Films from fractions 1 and 4 had lost their gloss and practically volatilized; films from fraction 3 had lost their gloss, were badly crazed and had partially volatilized; films from fraction 2 still had high gloss, were crazed, and had volatilized only slightly.

It is accordingly seen from the results of Example 1, that coatings formed from the adduct of phosphonitrilic chloride and hydroquinone cured with hexamethylenetetramine, had superior heat stability, adhesion and gloss retention properties as compared to coatings formed from the adduct itself, or from the adduct cured with either paraformaldehyde or trioxane.

EXAMPLE 2

Three formulations designated A, B and C below were prepared having varying proportions of hexamethylenetetramine. Each of these formulations was produced by adding the adduct of phosphonitrilic chloride and hydroquinone, produced substantially as described in Example 1, with hexamethylenetetramine, to n-butyl alcohol, in the proportions noted in Table I below. Formulation D containing only the adduct, served as control.

Table I

Percent by weight (A)
Adduct _____ 34.4
Hexamethylenetetramine _____ 1.6
n-Butyl alcohol _____ 64.0

(B)
Adduct _____ 33.8
Hexamethylenetetramine _____ 3.5
n-Butyl alcohol _____ 62.7

(C)
Adduct _____ 33.2
Hexamethylenetetramine _____ 4.8
n-Butyl alcohol _____ 62.0

(D)
Adduct _____ 35.0
n-Butyl alcohol _____ 65.0

The solutions were then each brushed on 302 stainless steel panels to form a film thickness of .001" to .002", and allowed to air dry 64 hours at room temperature. The resulting coatings were soluble in acetone.

The coatings were then each subjected to the following heating cycles:

(1) 2 hours at 200° F.: The surfaces of the films had not changed materially when compared to the air dried panels.

(2) 2 hours at 275° F.: The coatings from A, B and C became insoluble in acetone, indicating that curing had occurred. The coating from formulation D was still soluble in acetone.

(3) 1 hour at 425° F.: All coatings were now insoluble in acetone.

(4) 3 hours at 500° F. and 8 hours at 650° F.

At the end of heating cycle (4) the coating from formulation A still had some gloss, but commenced to char, the coating from formulation B had good gloss with relatively minor crazing, and the coating from formulation C showed some loss of gloss, and was crazed somewhat more than the coating from formulation B. The coating from formulation D was charred.

(5) 16 more hours at 650° F. Of formulations A to D, the coatings from formulations B and C changed the least. The coating from formulation B looked about the same, and the coating from formulation C showed a little more crazing, and somewhat less gloss.

These tests showed that the adduct of phosphonitrilic chloride and hydroquinone cured with hexamethylenetetramine had high thermal stability as compared to the cured adduct itself, not modified with hexamethylenetetramine, and further indicated that formulation B containing about 10% hexamethylenetetramine based on the weight of the resin gave best results.

EXAMPLE 3

Coatings having similar properties, particularly as to high heat stability, to the coatings produced in Examples 1 and 2 employing the adduct of phosphonitrilic chloride and hydroquinone cured by means of hexamethylenetetramine, can be formed by employing, in place of the adduct formed from the mixture of phosphonitrilic chlorides and hydroquinone of Example 1, the following adducts listed in Table II which are prepared in a manner similar to that described above in Example 1.

Table II

Adduct produced by reacting:

1. Mixture of phosphonitrilic chlorides (75% trimer and 25% tetramer) and phloroglucinol
2. Mixture of phosphonitrilic chlorides (75% trimer and 25% tetramer) and pyrogallol
3. Mixture of phosphonitrilic chlorides (75% trimer and 25% tetramer) and catechol
4. Mixture of phosphonitrilic chlorides (75% trimer and 25% tetramer) and resorcinol
5. Phosphonitrilic chloride trimer and hydroquinone
6. Phosphonitrilic chloride tetramer and hydroquinone
7. Phosphonitrilic chloride trimer and catechol
8. Phosphonitrilic chloride tetramer and pyrogallol Each of these adducts can be cured with hexamethylenetetramine and applied as a coating in a manner similar to that described in Example 1.

From the foregoing it is seen that the invention hereof provides a class of novel resins or polymers produced by curing the adduct of phosphonitrilic halides and polyhydroxy aromatic compounds, with hexamethylenetetramine, which resins have improved heat stability and other outstanding properties such as flexibility and high gloss retention at high temperatures, rendering such products particularly valuable as coatings which are to be subjected to high temperatures. Moreover, the adduct mixed with hexamethylenetetramine can be formed into a coating by a simple procedure and the coating readily applied to a substrate and cured at elevated temperature.

While we have described particular embodiments of our invention for purposes of illustration, it should be understood that various modifications and adaptations thereof may be made within the spirit of the invention as set forth in the appended claims.

We claim:

1. A polymeric product of high heat stability which consists essentially of the reaction product of (1) a condensation product in the form of a polymeric chain containing at least two cyclic PN-containing rings, each pair of such adjacent rings being linked together by at least one aromatic dioxy radical, said condensation product also containing aromatic oxy radicals containing free hydroxyl groups, said condensation product produced by reaction of a cyclic phosphonitrilic chloride and a polyhydroxy aromatic compound in the presence of a tertiary amine, and (2) hexamethylenetetramine.

2. A polymeric product of high heat stability which consists essentially of the reaction product of (1) a condensation product in the form of a polymeric chain containing at least two cyclic PN-containing rings, each pair of such adjacent rings being linked together by at least one p-phenylene dioxy radical, said condensation product also containing phenoxy radicals containing free hydroxyl groups, said condensation product produced by reaction of a cyclic phosphonitrilic chloride and hydroquinone in the presence of a tertiary amine, and (2) hexamethylenetetramine.

3. A polymeric product of high heat stability which consists essentially of the reaction product of (1) a condensation product in the form of a polymeric chain containing at least two cyclic PN-containing rings of the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups attached to some phosphorus atoms, and less than about 10% chlorine in the form of chlorine atoms attached to other phosphorus atoms, said condensation product produced by reaction of a cyclic phosphonitrilic chloride selected from the group consisting of the timer and tetramer, and a polyhydroxy aromatic compound in the presence of a tertiary amine, and (2) hexamethylenetetramine.

4. A polymeric product of high heat stability which consists essentially of the reaction product of (1) a condensation product in the form of a polymeric chain containing at least two cyclic PN-containing rings of the group consisting of trimeric and tetrameric PN rings, each pair of such adjacent rings being linked together through adjacent phosphorus atoms in adjacent rings by at least one p-phenylene dioxy radical, said condensation product also containing phenoxy radicals containing free hydroxyl groups attached to some phosphorus atoms, and less than about 10% chlorine in the form of chlorine atoms attached to other phosphorus atoms, said condensation product produced by reaction of a cyclic phosphonitrilic chloride selected from the group consisting of the trimer and tetramer, and hydroquinone in the presence of a tertiary amine, and (2) hexamethylenetetramine.

5. A polymeric product of high heat stability in the form of a polymeric chain containing at least two cyclic PN-containing rings, each pair of such adjacent rings being linked together by at least one aromatic dioxy radical of a polyhydroxy aromatic compound, some of the phosphorus atoms carrying aromatic oxy radicals containing free hydroxyl groups, and produced by reaction of a cyclic phosphonitrilic chloride and a polyhydroxy aromatic compound in the presence of a tertiary amine, with methylene bridges linking at least a portion of said last mentioned aromatic oxy radicals, said polymer containing less than about 10% chlorine in the form of chlorine atoms linked to phosphorus atoms.

6. A polymeric product of high heat stability in the form of a polymeric chain containing at least two cyclic PN-containing rings, each pair of such adjacent rings being linked together by at least one p-phenylene dioxy radical, some of the phosphorus atoms carrying phenoxy radicals containing free hydroxyl groups, and produced by reaction of a cyclic phosphonitrilic chloride and hydroquinone in the presence of a tertiary amine, with methylene bridges linking at least a portion of said last mentioned phenoxy radicals, said polymer containing less than about 10% chlorine in the form of chlorine atoms linked to some phosphorus atoms.

7. A coating solution consisting essentially of a mixture in a volatile organic solvent of (1) a condensation product in the form of a polymeric chain containing at least two cyclic PN-containing rings, each pair of such adjacent rings being linked together by at least one aromatic dioxy radical, said condensation product also containing aromatic oxy radicals containing free hydroxyl groups and less than about 10% chlorine, said condensation product produced by reaction of a cyclic phosphonitrilic chloride and a polyhydroxy aromatic compound in the presence of a tertiary amine, and (2) hexamethylenetetramine.

8. A coating solution consisting essentially of a mixture in a volatile organic solvent of (1) a condensation product in the form of a polymeric chain containing at least two cyclic PN-containing rings, of the group consisting of trimeric and tetrameric PN rings, each pair of such adjacent rings being linked together by at least one p-phenylene dioxy radical, said condensation product also containing phenoxy radicals containing free hydroxyl groups, and less than about 10% chlorine, said condensation product produced by reaction of a cyclic phosphonitrilic chloride selected from the group consisting of the trimer and tetramer, and hydroquinone in the presence of a tertiary amine, and (2) hexamethylenetetramine.

9. A coating solution consisting essentially of (1) a condensation product in the form of a polymeric chain containing at least two cyclic PN-containing rings of the group consisting of trimeric and tetrameric PN rings, each pair of such adjacent rings being linked together through adjacent phosphorus atoms in adjacent rings by at least one p-phenylene dioxy radical, said condensation product also containing p-hydroxy phenoxy radicals attached to some phosphorus atoms, and less than about 10% chlorine in the form of chlorine atoms attached to other phosphorus atoms, said condensation product produced by reaction of a cyclic phosphonitrilic chloride selected from the group consisting of the trimer and tetramer, and hydroquinone in the presence of a tertiary amine, and (2) hexamethylenetetramine, said hexamethylenetetramine being present in an amount of about 1 to about 15% by weight of said condensation product.

10. The process for producing a polymer of high heat stability, which comprises reacting at elevated temperature a mixture of (1) a condensation product in the form of a polymeric chain containing at least two cyclic PN-containing rings, each pair of such adjacent rings being linked together by at least one aromatic dioxy radical, said condensation product also containing aromatic oxy radicals containing free hydroxyl groups, and less than about 10% chlorine, said condensation product produced by reaction of a cyclic phosphonitrilic chloride and a polyhydroxy aromatic compound in the presence of a tertiary amine, and (2) hexamethylenetetramine.

11. The process for producing a polymer of high heat stability, which comprises heating at temperature of about 250 to about 500° F. a mixture of a condensation product in the form of a polymeric chain containing at least two cyclic PN-containing rings each pair of such adjacent rings being linked together by at least one aromatic dioxy radical, said condensation product also containing aromatic oxy radicals containing free hydroxyl groups and less than about 10% chlorine, said condensation product produced by reaction of a cyclic phosphonitrilic chloride and a polyhydroxy aromatic compound in the presence of a tertiary amine, and (2) about 1 to about 15% by weight of said condensation product of hexamethylenetetramine.

12. The process for producing a polymer of high heat stability, which comprises heating at temperature of about 250 to about 300° F. a mixture of a condensation product in the form of a polymeric chain containing at least two cyclic PN-containing rings each pair of such adjacent rings being linked together by at least one p-phenylene dioxy radical, said condensation product also containing phenoxy radicals containing free hydroxyl groups, and less than about 10% chlorine, said condensation product produced by reaction of a cyclic phosphonitrilic chloride and hydroquinone in the presence of a tertiary amine, and (2) about 1 to about 15% by weight of said condensation product of hexamethylenetetramine.

References Cited in the file of this patent

UNITED STATES PATENTS

| | | |
|---|---|---|
| 2,661,311 | Jenkins | Dec. 1, 1953 |
| 2,858,306 | Ratz et al. | Oct. 26, 1958 |
| 2,866,773 | Redfarn | Dec. 30, 1958 |